(12) United States Patent
Baker et al.

(10) Patent No.: US 12,682,029 B2
(45) Date of Patent: Jul. 14, 2026

(54) SCALABLE SEARCH AND RANKING OF BIOMETRIC SIGNATURES

(71) Applicant: Wells Fargo Bank, N.A., San Francisco, CA (US)

(72) Inventors: Michelle L. Baker, Littleton, CO (US); Ajit Gaddam, Danville, CA (US); Qiong Gui, Santa Clara, CA (US); Michael J. Quinlan, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 8 days.

(21) Appl. No.: 18/811,402

(22) Filed: Aug. 21, 2024

(65) Prior Publication Data

US 2026/0057051 A1 Feb. 26, 2026

(51) Int. Cl.
| | |
|---|---|
| *G06F 21/31* | (2013.01) |
| *G06F 11/34* | (2006.01) |
| *G06F 16/56* | (2019.01) |

(52) U.S. Cl.
CPC ........ *G06F 21/316* (2013.01); *G06F 11/3438* (2013.01); *G06F 16/56* (2019.01)

(58) Field of Classification Search
CPC ..... G06F 21/316; G06F 16/56; G06F 11/3438
See application file for complete search history.

(56) References Cited

U.S. PATENT DOCUMENTS

| | | |
|---|---|---|
| 7,318,056 B2 | 1/2008 | Taniguchi et al. |
| 7,860,870 B2 | 12/2010 | Sadagopan et al. |
| 8,972,871 B2 * | 3/2015 | Raub ..................... G06F 3/0486 |
| | | 715/765 |
| 9,152,977 B2 | 10/2015 | Zwicky |

(Continued)

FOREIGN PATENT DOCUMENTS

WO WO-2014079916 A2 5/2014

OTHER PUBLICATIONS

Martín-Albo et al., (Strokes of insight: User intent detection and kinematic compression of mouse cursor trails, IPM, 2016, 15 pages) (Year: 2016).*

(Continued)

*Primary Examiner* — Oleg Korsak
(74) *Attorney, Agent, or Firm* — SCHWEGMAN LUNDBERG & WOESSNER, P.A.

(57) ABSTRACT

Systems and methods are directed to detecting fraudulent activity based on biometric signatures. A capture component captures data associated with user interactions with a user interface displayed by a computing device. The captured data includes mouse movement. The captured data is converted into an image of the mouse movement. An image encoder encodes the image into an image vector. Subsequently, an analysis system searches a vector database to identify one or more historical image vectors that are similar to the image vector. The vector database comprises a plurality of image vectors corresponding to previously encoded images, whereby at least some of the plurality of image (Continued)

vectors are flagged as indicating fraudulent activity. A result based on the identified historical image vectors is outputted. The result can comprise a risk score for each of the identified historical image vectors that is based in part on a similarity difference measurement.

20 Claims, 6 Drawing Sheets

(56) References Cited

U.S. PATENT DOCUMENTS

| | | | | |
|---|---|---|---|---|
| 9,223,868 | B2 | 12/2015 | Battle et al. | |
| 9,541,995 | B2 | 1/2017 | Turgeman et al. | |
| 10,104,113 | B1 * | 10/2018 | Stein | H04L 63/1425 |
| 10,474,815 | B2 | 11/2019 | Turgeman | |
| 10,521,021 | B2 | 12/2019 | Underkoffler et al. | |
| 10,588,017 | B2 * | 3/2020 | Dutt | G06F 1/1694 |
| 10,754,936 | B1 * | 8/2020 | Hawes | H04L 63/08 |
| 11,513,601 | B2 | 11/2022 | Pinault et al. | |
| 2004/0221171 | A1 * | 11/2004 | Ahmed | G06F 21/316 |
| | | | | 726/23 |
| 2008/0270154 | A1 | 10/2008 | Klots et al. | |
| 2014/0317744 | A1 * | 10/2014 | Turgeman | H04W 12/122 |
| | | | | 726/23 |
| 2014/0344927 | A1 * | 11/2014 | Turgeman | G06F 21/31 |
| | | | | 726/22 |
| 2015/0310196 | A1 * | 10/2015 | Turgeman | H04W 12/06 |
| | | | | 726/19 |
| 2016/0371476 | A1 * | 12/2016 | Turgeman | G06F 3/04842 |
| 2017/0017781 | A1 * | 1/2017 | Turgeman | H04L 63/08 |
| 2017/0054702 | A1 * | 2/2017 | Turgeman | G06F 21/31 |
| 2017/0076089 | A1 * | 3/2017 | Turgeman | G06F 3/04812 |
| 2017/0091450 | A1 * | 3/2017 | Turgeman | H04L 63/145 |
| 2017/0193526 | A1 * | 7/2017 | Turgeman | G06Q 30/0185 |
| 2018/0012003 | A1 * | 1/2018 | Asulin | G06F 21/36 |
| 2018/0314816 | A1 * | 11/2018 | Turgeman | G06F 21/40 |
| 2018/0349583 | A1 * | 12/2018 | Turgeman | H04L 63/0861 |
| 2019/0220863 | A1 * | 7/2019 | Novick | G06Q 20/10 |
| 2020/0244639 | A1 * | 7/2020 | Arif Khan | G06N 3/0499 |
| 2020/0273040 | A1 * | 8/2020 | Novick | G06Q 20/4016 |
| 2021/0089571 | A1 * | 3/2021 | Perone | G06F 40/284 |
| 2021/0110014 | A1 * | 4/2021 | Turgeman | G06F 11/3419 |
| 2021/0152555 | A1 * | 5/2021 | Djosic | G06N 20/00 |
| 2021/0264003 | A1 * | 8/2021 | Solano | G06N 5/01 |
| 2021/0319527 | A1 * | 10/2021 | Benkreira | G06N 3/0464 |
| 2021/0322827 | A1 * | 10/2021 | Case, Jr. | G07F 17/323 |
| 2022/0109700 | A1 * | 4/2022 | Guruswamy | G06F 21/602 |
| 2024/0265075 | A1 * | 8/2024 | Breitling | G06F 21/31 |

OTHER PUBLICATIONS

Cardenas, Erika, "How to build an Image Search Application with Weaviate", [Online]. Retrieved from the Internet: <https://weaviate.io/blog/how-to-build-an-image-search-application-with-weaviate>, (Oct. 18, 2022), 15 pages.

* cited by examiner

SUBMIT

RESULT

OVAL SQUARE

SUBMIT

RESULT

TRIANGLE SQUARE

SCALABLE SEARCH AND RANKING OF BIOMETRIC SIGNATURES

TECHNICAL FIELD

The subject matter disclosed herein generally relates to biometric signatures. Specifically, the present disclosure addresses systems and methods that capture user interactions and encode the user interactions as image vectors for comparison to find similar biometric signatures in the context of identifying fraudulent behavior or activity.

BACKGROUND

Typically, existing technology surrounds an ability to track behavior biometric features that are specific to a user. This can include, for example, how the user types on a keyboard or how the user moves a mouse. An algorithm can then decide if new tracked data is consistent with a prior record. However, these existing mouse monitoring or behavior biometric solutions are not capable of comparing signatures without an existing filter, such as a username of the user. Thus, existing technology or solutions cannot perform a general search for biometric signatures globally against all records that have been detected before without a filter.

DETAILED DESCRIPTION

Figure 1:
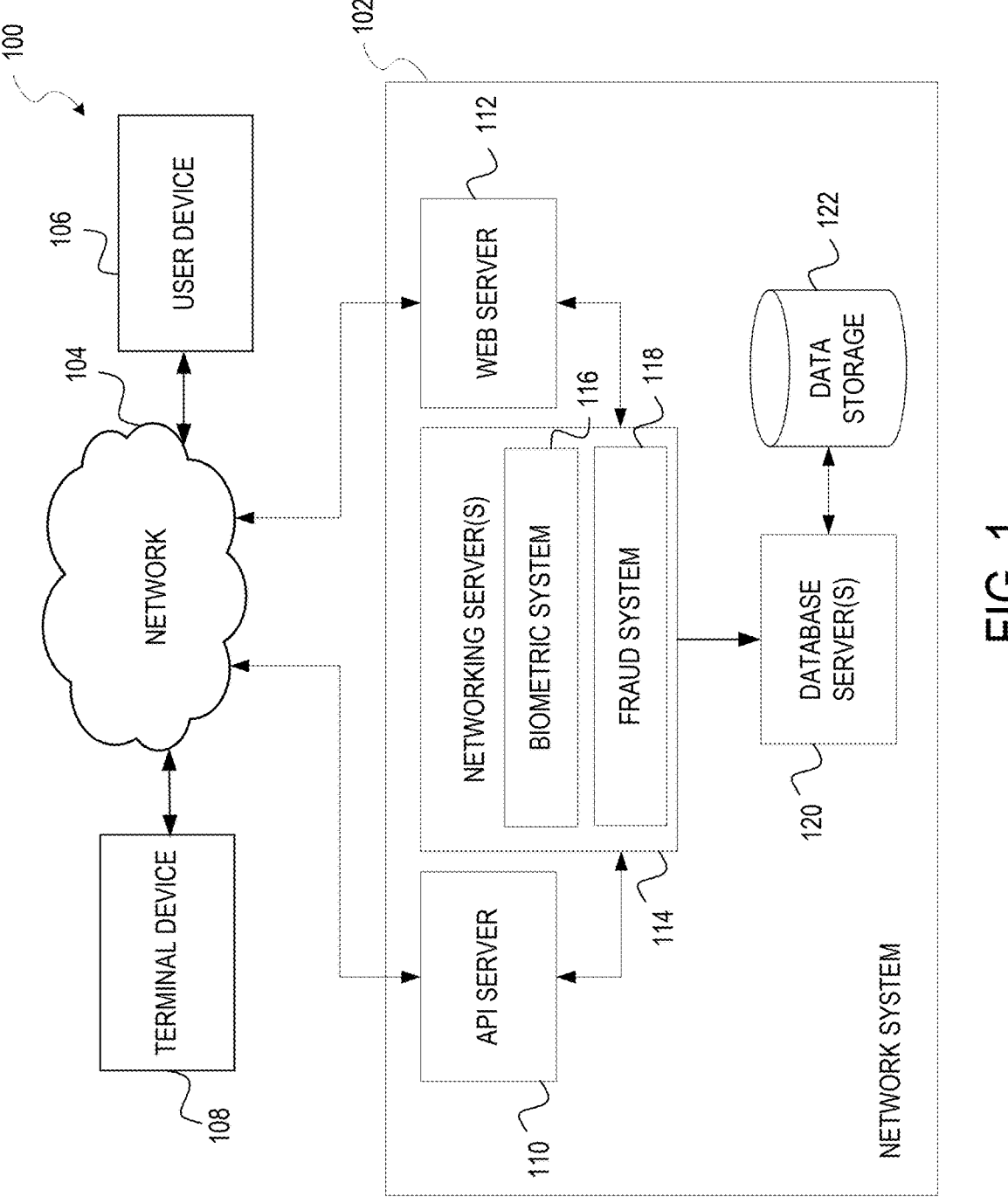
FIG. 1 is a diagram illustrating an example network environment suitable for detecting fraudulent behavior based on biometric signatures, according to example implementations.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter can be practiced without some or other of these specific details. Examples merely typify possible variations. Unless explicitly stated otherwise, structures (e.g., structural components) are optional and can be combined or subdivided, and operations (e.g., in a procedure, algorithm, or other function) can vary in sequence or be combined or subdivided.

Systems and methods that use biometric signatures to detect fraudulent behavior or activity are discussed herein. Example implementations capture user interactions including mouse movement of a user accessing secure/confidential information associated with a user account (e.g., a banking account). The captured data of the mouse movement is converted into an image and the image encoded, by an image encoder, into an image vector. The image encoder can be a trained neural network. A vector database can then be searched using the image vector to identify similar historical image vectors that have been tagged as indicating fraudulent behavior or activity. Further still, similar historical image vectors associated with other user accounts can be identified which may indicate that the same user (or group of users) have performed fraudulent operations with these other user accounts. The similar historical image vectors are historical image vectors that meet or exceed a similarity threshold. The similarity threshold can be, for example, a percentage of similarity (e.g., 55% similarity, 60% similarity, or 75% similarity).

In example implementations a risk score can be determined for each historical image vector that indicates how close the current image vector matches with each historical image vector. In one implementation, the risk score is based on cosine similarity. The risk score can be adjusted based on whether other metadata captured during the user interactions matches metadata of the corresponding historical image vectors. The metadata can include, for example, a location of the user, an Internet Protocol address, a device identifier, a browser specification, a language preference, a time zone, keystrokes, and/or click throughs. A result can be outputted that includes data associated with similar historical image vector having a risk score that transgresses a risk threshold. In some implementations, the risk threshold is the similarity threshold. The image vector can also be flagged as indicating potential fraudulent behavior and stored to the vector database to be used for future analysis.

The result that includes data associated with similar historical image vector can be passed to a further system that can make a final determination of fraud and/or can address potential fraud activities. Because example implementations allow for the comparison of image vectors globally against all records in a vector database without the need for a filter, fraudsters who are targeting multiple user accounts can be identified since fraudsters typically perform the same operations in a similar manner. Thus, the image vector, if identified as likely indicating fraudulent behavior (e.g., matching fraudulently tagged image vectors to a high degree), can also be used to identify other historical image vectors of other instances of potential fraud that may have occurred in a different account than an account currently (or most recently) being accessed by the user. This comparison can be performed historically to identify fraud that has already occurred, or it can be employed to alert operators or algorithms to new attempts to commit fraud at a future date.

As an example, a fraudster can copy and paste credentials or other data from text or spreadsheet off screen of a browser. This motion (e.g., user interaction) can be captured whereby the fraudster is moving their mouse off screen and then back to a browser page (e.g., login page) repetitively for different accounts. In this case, how the user is using their mouse to move from a username field to a password text entry field, for example, is characteristic—a biometric signature. That is, people can perform this motion in a specific way, especially when performing repetitive activity.

When an organized fraud ring is being scripted to perform an operation in a specific way, they may wait a certain amount of time between operations and build that into an order of operations for a person to be able to go through and follow. Thus, the motions (e.g., to perform these operations)

along with time elements (e.g., amount of time to perform operations or between operations) are repeated. For instance, the person can go from X account to Y account to Z account in a scripted manner, which provides a predictable pattern. These predicted patterns may occur within a certain time-frame in different accounts, where the patterns are almost identical.

Further still, example implementations can track user interactions beyond just a single browser page or user interface. For instance, example implementations can capture a pattern of mouse movement on a login page, followed by, once an account balance or a landing page is shown, capturing a pattern of a user immediately moving to wire transfer. The way that happens is often characteristic of a single person (or group of people) performing the same operations (e.g., user interactions) over and over again.

As a result, example implementations provide a technical solution to the technical problem of using biometric signatures to identify matching historical biometric signatures without a filter. In particular, the technical solution captures mouse movements of user and converts the mouse movements into one or more images. Each image is encoded into an image vector that can be used to search a vector database comprising historical image vectors that have been previously encoded and/or analyzed. Similar (or identical) historical image vectors are identified and can be returned as a result. The use of the vector database allows for the search to be performed over a large dataset using just a vector and does not require use of any filters. Additionally, the use of the vector database allows for matching of patterns that may not be prevalent or even recent in an efficient and effective manner.

FIG. 1 is a diagram illustrating an example network environment 100 suitable for detecting fraudulent behavior or activity based on biometric signatures, according to example implementations. A network system 102 provides server-side functionality via a communication network 104 (e.g., the Internet, wireless network, cellular network, or a Wide Area Network (WAN)) to a user device 106 and/or a terminal device 108. The network system 102 is configured to detect potential fraudulent behavior or activity based on biometric signatures, as will be discussed in more detail below.

In various cases, the user device 106 is a device associated with a user of the network system 102 that wants to conduct a transaction and/or access confidential information managed by the network system 102. For example, the network system 102 can be associated with a financial institution (e.g., a bank) and the user device 106 wants to conduct a wire transfer or access banking account information. The user device 106 can comprise, but is not limited to, a smartphone, a tablet, a laptop, multi-processor systems, microprocessor-based or programmable consumer electronics, or any other portable communication device that can access the network system 102. In some cases, the user device 106 can include a banking application that exchanges data, via the network 104, with the network system 102. For example, the banking application can be a local version of an application or component of the network system 102 that provides data to and accesses data from one or more components at the network system 102. In some implementations, the banking application is downloaded from the network system 102. In other cases, the user device 106 comprises a browser application that allows for access to the network system 102.

Additionally, the user device 106 can comprise a display component (not shown) to display information in the form of user interfaces. The user interfaces can include, for example, a login page, a landing page, account detail pages, and so forth.

The terminal device 108 is a device located at a location where the user can access secure information and/or conduct transactions. For example, the terminal device 108 can be located at a bank (e.g., at a teller station, as part of an automated teller machine). The terminal device 108 includes a user interface that displays an area where the user is requested to either present a signature or draw an object in response to a challenge. The terminal device 108 can also include a pressure sensor that can capture an amount of pressure applied during the presentation of the signature or the drawing of the object. Further still, a speed at which the signature is presented or an object drawn can also be captured by the terminal device. The motion of a stylus/mouse and the way the user moves the stylus/mouse provides a biometric signature. Thus, a biometric signature can be tracked and entered into the vector database so that fraudsters can be identified when presenting themselves as multiple customers in sequential banking interactions, for example. All of this captured data is the user interaction data that is used by the network system 102 to identify potential fraudulent behavior.

In example implementations, the user device 106 and/or the terminal device 108 interfaces with the network system 102 via a connection with the network 104. Depending on the form of the user device 106 and/or the terminal device 108, any of a variety of types of connections and networks 104 can be used. For example, the connection can be Code Division Multiple Access (CDMA) connection, a Global System for Mobile communications (GSM) connection, or another type of cellular connection. Such a connection can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (e.g., Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

Turning specifically to the network system 102, an application programing interface (API) server 110 and a web server 112 are coupled to and provide programmatic and web interfaces respectively to one or more networking servers 114. The networking servers 114 host various systems including a biometric system 116 and a fraud system 118, which each comprises a plurality of components and can each be embodied as a combination of hardware, software, and/or firmware.

The biometric system 116 comprises components that manage potential fraud detection based on biometric signatures. The network system 102 is configured to receive or capture indications of user interactions such as mouse, stylus, or cursor movement (collectively referred to herein as "mouse movement"). For example, the user interactions can be captured on the user device 106 using Javascript and/or using existing browser event handlers that allow for the recording of mouse positions and keystrokes as they occur. The biometric system 116 then encodes a corresponding image based on the captured user interactions into an image vector (also referred to herein as a "biometric signature"). The image vector is used to search for similar historical image vectors (e.g., meeting or exceeding a similarity threshold) which may be tagged as indicating fraudulent behavior. Additionally or alternatively, the image vector can be used to identify other similar image vectors associated with other accounts that can indicate fraudulent behavior in the other accounts. The biometric system 116 will be discussed in more detail in connection with FIG. 2 below.

The fraud system 118 is configured to determine, based on the results of the biometric system 116, whether the user interactions indicate fraudulent behavior and/or if other accounts are also experiencing fraudulent behavior based on similar image vectors. In some cases, the fraud system 118 can include components that contact an owner of the account in which potential fraudulent behavior is detected to verify whether the user interactions are that of the owner. For instance, a text message or email can be automatically generated and sent by the fraud system 118 to the account owner indicating the user interactions and requesting confirmation that they were the one accessing their account. In some cases, the fraud system 118 can, additionally or alternatively, bump up an authorization level, require second factor authentication for future access, or freeze any affected user accounts (e.g., until the account owner verifies that they were the one performing the user interactions). Further still, the fraud system 118 can stop or redirect a likely fraudulent user from accessing a sensitive resource (e.g., the account). For example, the likely fraudulent user can be logged out and displayed a message that asks them to call a call-center for customer service.

The networking servers 114 can, in turn, be coupled to one or more database servers 120 that facilitate access to one or more storage repositories or data storage 122. The data storage 122 is a storage device storing, for example, the user accounts of the users of the network system 102 (e.g., banking accounts).

Any of the systems, data storage, or devices (collectively referred to as "components") shown in, or associated with, FIG. 1 can be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 can be combined, and the functions described herein for any single component can be subdivided among multiple components. Functionalities of one component can, in alternative examples, be embodied in a different component. For example, some of the operations and components of the biometric system 116 can be embodied within the fraud system 118 or vice-versa. Additionally, any number of user devices 106 and terminal devices 108 can be embodied within the network environment 100. While only a single network system 102 is shown, alternatively, more than one network system 102 can be included (e.g., localized to a particular region).

Figure 2:
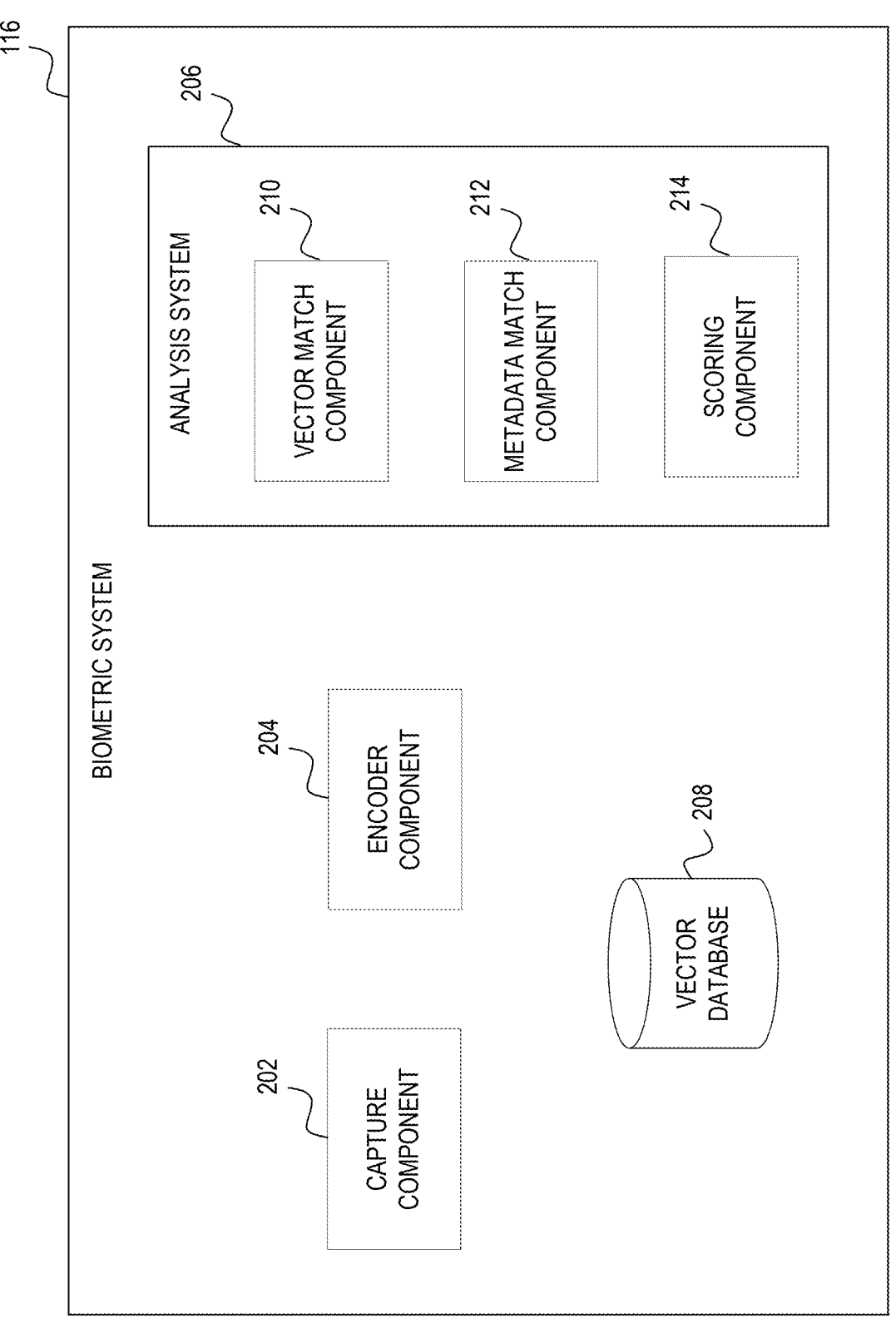
FIG. 2 is a diagram illustrating components of a biometric system, according to example implementations.

FIG. 2 is a diagram illustrating components of the biometric system 116, according to example implementations. In example implementations, the biometric system 116 comprises one or more servers that manages capturing user interactions, encoding an image based on the user interactions into an image vector, and searching a vector database for similar image vectors that may have been flagged as fraudulent and/or similar image vectors for other accounts that can indicate similar fraudulent behavior. To enable these operations, the biometric system 116 comprises a capture component 202, an encoder component 204, an analysis system 206, and a vector database 208, all configured in communication with one another (e.g., via a bus, shared memory, or a switch). The biometric system 116 can comprise other components (not shown) that are not germane to example implementations. It is noted that some of the components of the biometric system 116 can additionally or alternatively be embodied at the fraud system 118.

The capture component 202 is configured to manage captured user interaction data including user interactions of a user with browser pages at the user device 106 and/or a user interface of the terminal device 108. The user interaction data can include mouse movement, speed of the mouse movement, pressure applied with the mouse movement, keystrokes, and click throughs. In some implementations, the capture component 202 captures or identifies (e.g., from captured user interaction data from the user device 106) a position of the mouse as it moves at various times (e.g., time values) to obtain a sequence of mouse movements.

In some implementations, the capture component 202 comprises a mouse tracking or monitoring tool. The mouse tracking or monitoring tool can measure a stylus, cursor, or mouse property as it varies with time. In some cases, an accelerometer can also be used to measure motions of the stylus, cursor, or mouse. The stylus, cursor, or mouse can, in some examples, be virtual (e.g., in an augmented reality system). Additionally, some aspects of normalization can be used, such as for motion within a browser window as a fraction of the window size.

The capture component 202 also captures or identifies metadata associated with the user interactions. The metadata provides "red flags" that can indicate that the user interactions are more likely to be associated with a fraudster. For example, a fraudster can access an account from a time zone that is different from the account owner's actual time zone. Another "red flag" can be based on a time lapse that does not allow for it. For example, if a user is detected to be in New York and a minute later detected to be in California. The metadata can include one or more of, for example, a location of the user, an Internet Protocol address, a device identifier of the user device being user, a browser specification, a language preference, and/or a time zone of the user.

In some cases, the capture component 202 also captures or identifies one or more time elements associated with each operation performed on the user interface (e.g., captured metadata). For example, a first time can be captured when a user logs into their account and a second time can be captured when a user activates a wire transfer. An amount of time between these two operations can be another piece of metadata that can be used to detected fraudulent behavior. For example, if the user instantly goes from logging into an account to initiating a wire transfer and this is repeatedly performed for multiple accounts from a same IP address, this is an indicator that the user interactions are likely fraudulent.

The capture of user interaction data can occur over more than one browser page. For instance, the user may perform mouse movements and enter a username and password (e.g., keystrokes) on a login page. Subsequently, the user is presented a landing page where the user may then move their mouse in a particular manner to view their account or perform other operations. The user interactions for each of these browser pages are captured or identified by the capture component 202 and linked together for analysis by the analysis system 206, as will be discussed in more detail below.

The encoder component 204 is configured to manage encoding of the user interaction data into an image vector. In example implementations, the encoder component 204 converts the captured data into an image and then encodes the image into an image vector. Specifically, the mouse movements (e.g., mouse position and time values) that were captured by the capture component 202 are converted into an image of the mouse movements (e.g., using Python or other programming language). In some cases, the image is a black and white image of the mouse movements. In implementations that include other characteristics of the user interactions in generating the image such as a speed of the mouse movement or a pressure applied during the mouse movement, the image can be generated with color. For example, for black and white images, time of each mouse position can be ignored and a line is drawn between each datapoint. In contrast, color images can be created using the sampling time to compute, for example, a velocity, an acceleration, or some parametric combination of the two. The computed value is rendered/encoded as a color value. Similarly, a pressure measurement can be rendered on a color scale.

Once the image is generated, the encoder component 204 encodes the image into an image vector. In example implementations, the encoder component 204 comprises a neural network trained to classify images. The output of the neural network comprises a multi-dimensional image vector.

The analysis system 206 is configured to manage identifying of historical image vectors that are similar to the multi-dimensional image vector generated by the encoder component 204. An output of the analysis system 206 can comprise one or more historical image vectors having a risk score that transgresses a risk threshold. In order to perform these operations, the analysis system 206 comprises a vector match component 210, a metadata match component 212, and a scoring component 214.

Previously encoded image vectors are stored in the vector database 208. Because these image vectors are encoded before the image vector that is being analyzed, they are referred to herein as historical image vectors. The vector database 208 is a database primarily searchable by vector index that can references tags and metadata. In example implementation, the vector database 208 includes historical image vectors that have been identified as indicating fraudulent behavior. As such, the tags can include an indication that the corresponding historical image vector indicates fraudulent behavior. The vector database 208 can also include historical image vectors that have not been identified as indicating fraudulent behavior and/or historical include image vectors from other user interactions with other accounts associated with the network system 102. The metadata can include the metadata captured by the capture component such as, for example, a location of the user, an Internet Protocol address, a device identifier, a browser specification, a language preference, and/or a time zone.

The vector match component 210 identifies historical image vectors that are similar to the image vector. In example implementations, the vector match component 210 uses cosine similarity to identify the similar historical image vectors. Cosine similarity measures similarity between two image vectors defined in an inner product space based on a cosine of an angle between the two image vectors. Thus, the cosine similarity can be represented as $$\cos(\theta) = \frac{\sum a_1 b_1 + a_2 b_2 + a_N b_N}{|a|\,|b|}.$$

Based on the cosine similarity, the vector match component 210 identifies an initial set of one or more similar historical image vectors and their corresponding similarity value or score. For example, the initial set of one or more similar historical image vectors can comprise historical image vectors that have a cosine similarity of more than 0.5 or more than 50% similarity match (e.g., meets or transgresses a similarity threshold of 0.5 or 50%). The similarity threshold can be set by an administrator or other user of the network system 102. In some implementations, the initial set of the one or more similar historical image vectors can be passed to the metadata match component 212 for further analysis and the cosine similarity provided to the scoring component 214.

The metadata match component 212 determines whether corresponding metadata of the historical image vectors identified by the vector match component 210 match metadata associated with the captured user interactions. The metadata can include, for example, keystrokes, click throughs, a location of the user, an Internet Protocol address, a device identifier, a browser specification, a language preference, and/or a time zone. In some implementations, the metadata can be stored in other columns of the vector database 208 and associated with the corresponding image vector. In other implementations, the metadata can be stored in a different database but linked the corresponding image vector.

The metadata matching is an enriching query that improves a risk model (e.g., to improve the risk score). The more metadata that matches, the higher the corresponding risk score. For example, the metadata match component 212 can determine that a geographic location and an Internet Protocol address associated with the image vector being analyzed matches a geographic location and an Internet Protocol address associated with one of the identified historical image vectors. The metadata matching component 212 can also be programmed to lower the risk score when certain metadata matches are present. This can be accomplished through use of a rules engine. These indications of matches can be passed to the scoring component 214, which adjusts the risk score accordingly.

The scoring component 214 generates an overall risk score for each similar historical image vector of the initial set of similar historical vectors. In one implementation, the scoring component 214 takes an initial risk score (e.g., the cosine similarity) determined by the vector match component 210 for each similar historical image vector and adjusts the initial risk score based on whether corresponding metadata of the similar historical image vectors match metadata associated with the image vector being analyzed. The adjustment can be based on the type of metadata that matches. For example, a location or time zone match may trigger a smaller adjustment than a device identifier or Internet Protocol address match. That is, the more specific and unique the metadata, the larger the adjustment applied to the initial risk score.

A final risk score can be used to rank the similar historical image vectors. In some cases, only a top number (e.g., top two) matching historical image vectors are output in the result.

In some cases, the final risk score is compared to a risk score threshold by the scoring component 214. For example, the risk score threshold may be 0.7 or 70%. The risk score threshold may be set by an administrator or user of the network system 102. In some implementations, the risk score threshold is the same as the similarity threshold. Any similar historical image vectors that do not transgress the risk score threshold are removed from a final set of similar historical image vectors that are output in the result. In other cases, all identified historical image vectors are output in the result regardless of the risk score threshold.

The result output by the biometric system 118 comprises data associated with the similar historical image vectors. For example, the data can include one or more of the corresponding image, the corresponding risk score, one or more matching metadata, and so forth.

While FIG. 2 illustrates the analysis system 206 including the metadata match component 212 and the scoring component 214, an alternative implementation may only include the vector match component 210 in the analysis system 206. In this implementation, the risk score can be simply the cosine similarity or other distance similarity measure.

Figure 3B:
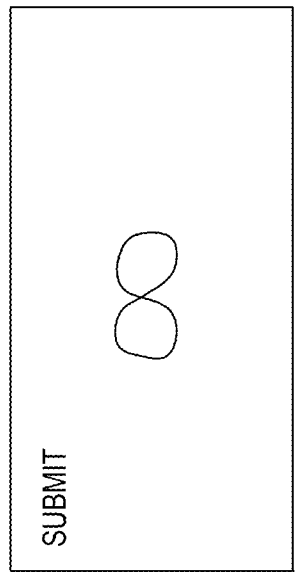
FIG. 3A and FIG. 3B are examples of biometric signature matching, according to example implementations.
Figure 3B:
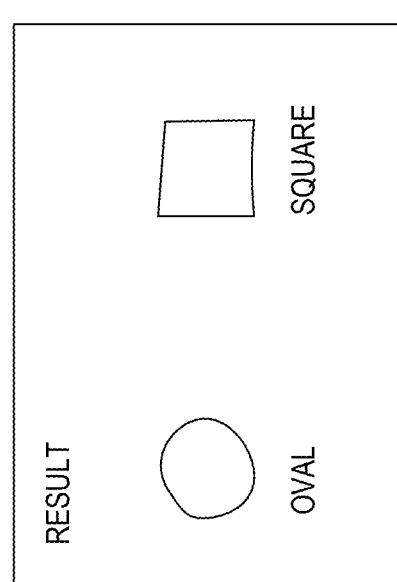
Figure 3A:
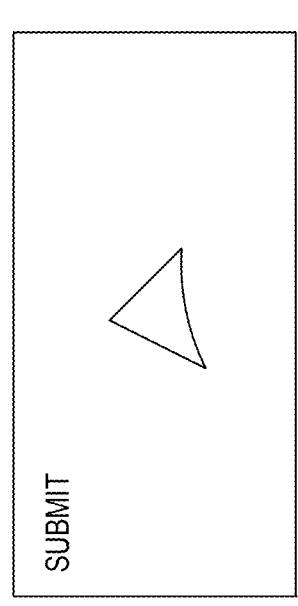
Figure 3A:
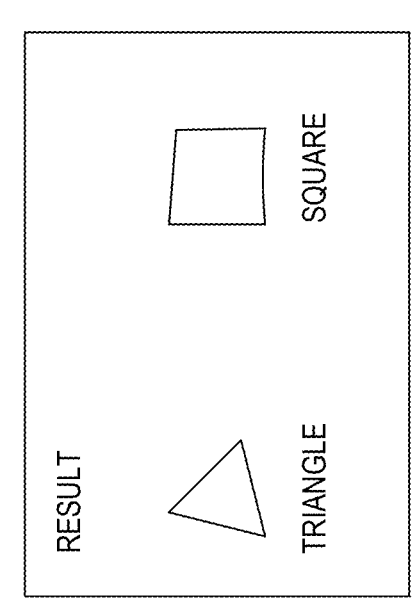

FIG. 3A and FIG. 3B illustrate examples of biometric signature matching, according to example implementations. Assume that the vector database 208 comprises vectors for mouse-drawn images that include a triangle, an oval, and a square. If the capture mouse movements indicate a shape that is a triangle, as shown in FIG. 3A, then the biometric system 116 can provide a result including two similar image vectors based on the analysis and the risk scores determined by the analysis system 206. One of the similar image vectors represents a triangle and a second similar image vector represents a square.

In the case of user interactions with multiple browser pages, the biometric system 116 can analyze the user interactions with each browser page and combine the results. For example, assume the user interactions (e.g., mouse movement) on a first page (e.g., a login page) results in a submitted image as shown in FIG. 3A, while the user interactions on a second page (e.g., a landing page after the login page) results in a submitted image as shown in FIG. 3B. The user interactions for the first page provides a result of a triangle and a square. The user interactions for the second page provides a result of an oval and a square. Assuming that the triangle and oval (e.g., their image vectors) are both tagged (e.g., with a bad actor session identifier) as being associated with fraudulent behavior for these respective browser pages in sequence, the fraud system 118 determines that the user interactions are likely associated with fraudulent behavior (e.g., the user is likely a fraudster). In other words, a pattern that includes the results of two separate image vector database queries is used to determine whether the user interactions involve fraudulent behavior.

In an alternative implementation, the analysis may be performed sequentially. For example, the analysis is first performed for the first browser page (e.g., the login page). If the analysis indicates that the user interactions are likely associated with fraudulent behavior (e.g., the triangle image), then the biometric system analyzes the user interactions on the second browser page (e.g., the landing page). However, if the analysis with the user interactions on the first browser page is not identified as likely being fraudulent behavior, the analysis can, in some implementations, stop without having to analyze the user interactions on the second browser page. In other implementations, analysis can still occur on the second browser page even though the user interactions on the first browser page is not likely fraudulent behavior.

In a further implementation, the images resulting from the user interactions with the first browser page and the second browser page can be combined into a single image and analyzed. For example, the image for the first browser page can be overlapped with the image for the second browser page. The combined image is then encoded into a single image vector and compared by the analysis system 206 to the vector database 208 to identify similar historical image vectors.

In some implementations, a time element between the user interactions on the first browser page and the second browser page can be included in the analysis. For example, there may be a sequence of time values associated with the mouse movements (e.g., each position of the mouse) on each browser page and between the browser pages that is considered by the biometric system 116 (e.g., as part of the speed of the mouse or as metadata).

Figure 4:
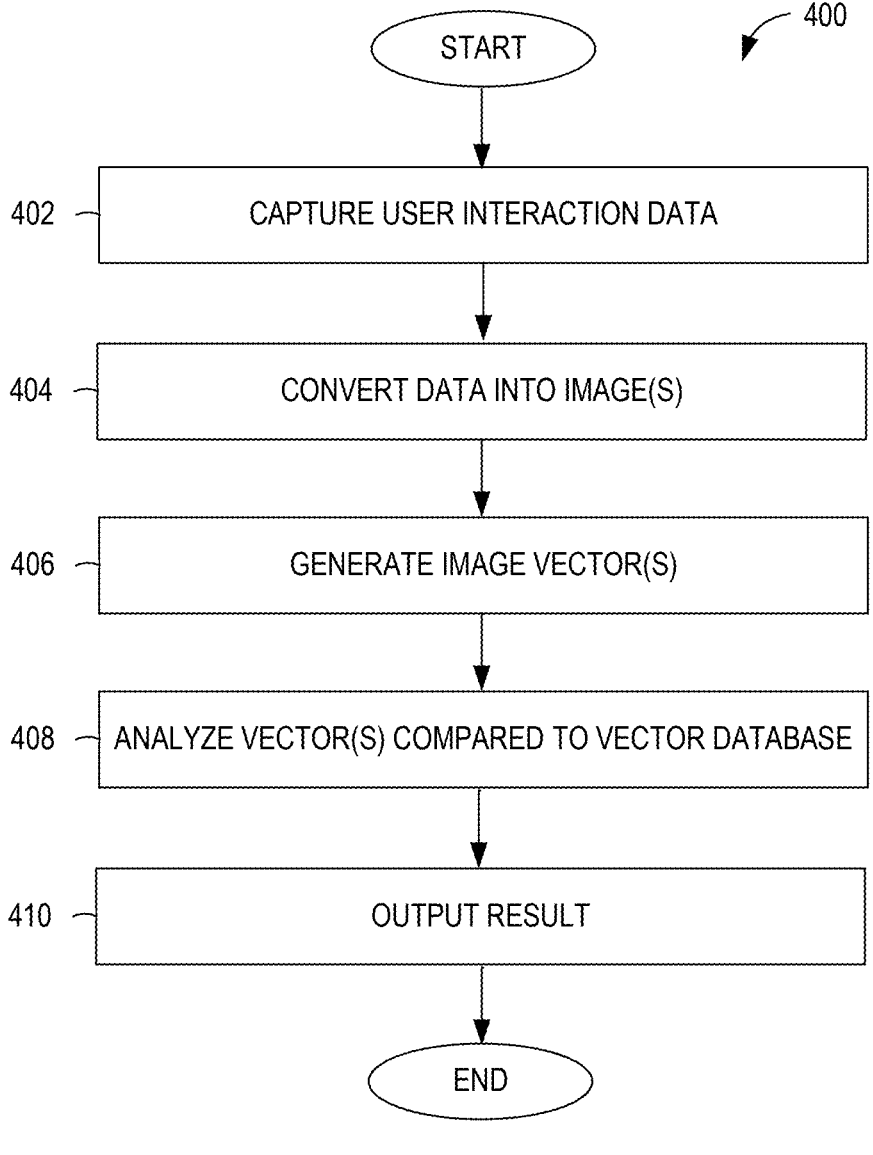
FIG. 4 is a flowchart illustrating operations of a method for detecting fraudulent behavior based on biometric signatures, according to example implementations.

FIG. 4 is a flowchart illustrating operations of a method 400 for detecting fraudulent behavior based on biometric signatures, according to example implementations. Operations in the method 400 can be performed by the biometric system 116, using components described above with respect to FIG. 2. Accordingly, the method 400 is described by way of example with reference to the biometric system 116. However, it shall be appreciated that at least some of the operations of the method 400 can be deployed on various other hardware configurations or be performed by similar components residing elsewhere in the network environment 100. Therefore, the method 400 is not intended to be limited to the biometric system 116.

In operation 402, the capture component 202 captures user interaction data. The user interaction data comprises user interactions of a user with a user interface at the user device 106 and/or the terminal device 108. In particular, the capture component 202 captures a position of the mouse as it moves at various times (e.g., time values) to obtain a sequence of mouse movements. The user interaction data can also include metadata associated with the user interactions. The metadata can include one or more of, for example, a location of the user, an Internet Protocol address, a device identifier of the user device being user, a browser specification, a language preference, keystrokes, click throughs, and/or a time zone of the user. In some cases, the metadata can include one or more time elements associated with each operation performed on the user interface. For example, an amount of time between two operations can be another piece of metadata that can be used to detected fraudulent behavior. In some cases, the user interaction data is captured over more than one browser page.

In operation 404, the encoder component 204 converts the user interaction data into an image for each browser page or a user interface of the terminal device 108. Specifically, the mouse position and time values of the mouse movement that were captured in operation 402 are converted into an image of the mouse movements. In some cases, the image is a black and white image of the mouse movements. In implementations that include other characteristics of the user interactions in generating the image such as a speed of the mouse movement or a pressure applied during the mouse movement, the image can be generated with color.

In operation 406, the encoder component 204 generates an image vector for each browser page or user interface of the terminal device 108. In example implementations, the encoder component 204 encodes each image into an image vector. In example implementations, the encoder component 204 comprises a neural network trained to classify images. The output of the neural network can comprise a multidimensional image vector.

In some implementations, an optional prefiltering process may be performed by the biometric system 116. With prefiltering, the metadata match component 212 analyzes the metadata associated with the captured user interactions to determine whether the metadata provides "red flags" that indicate that the user interactions may be fraudulent behavior. For example, the metadata may indicate an Internet Protocol address or location that has been flagged in the past as being associated with fraudulent behavior. If the metadata does not appear to be associated with fraudulent behavior, the biometric system 116 can decide to end the analysis without having to perform a search in the vector database 208.

In operation 408, the analysis system 206 analyzes the image vector(s) compared to the historical vector images in the vector database 208. Specifically, the analysis system 206 searches for similar historical image vectors using the image vector(s) generated in operation 406. Operation 408 will be discussed in more detail in connection with FIG. 5 below.

In operation 410, the analysis system 206 outputs a result of the biometric system 116. The result may comprise data associated with one or more similar historical image vectors. In some cases, the result includes an image corresponding to the one or more similar historical image vectors and/or the corresponding risk score. In example implementations, the output of the result is forwarded to the fraud system 118 for further processing. If the image vector is determined, by a fraud analyst by the fraud system 118, to indicate fraudulent behavior based on the results, the image vector can be tagged as fraudulent and stored to the vector database for future use. Additionally, the fraud system 118 can notify an affected account owner, log the likely fraudulent user out, require the account owner or likely fraudulent user to contact customer service, bump up an authorization level, require second factor authentication for future access, and/or freeze any affected user accounts.

Figure 5:
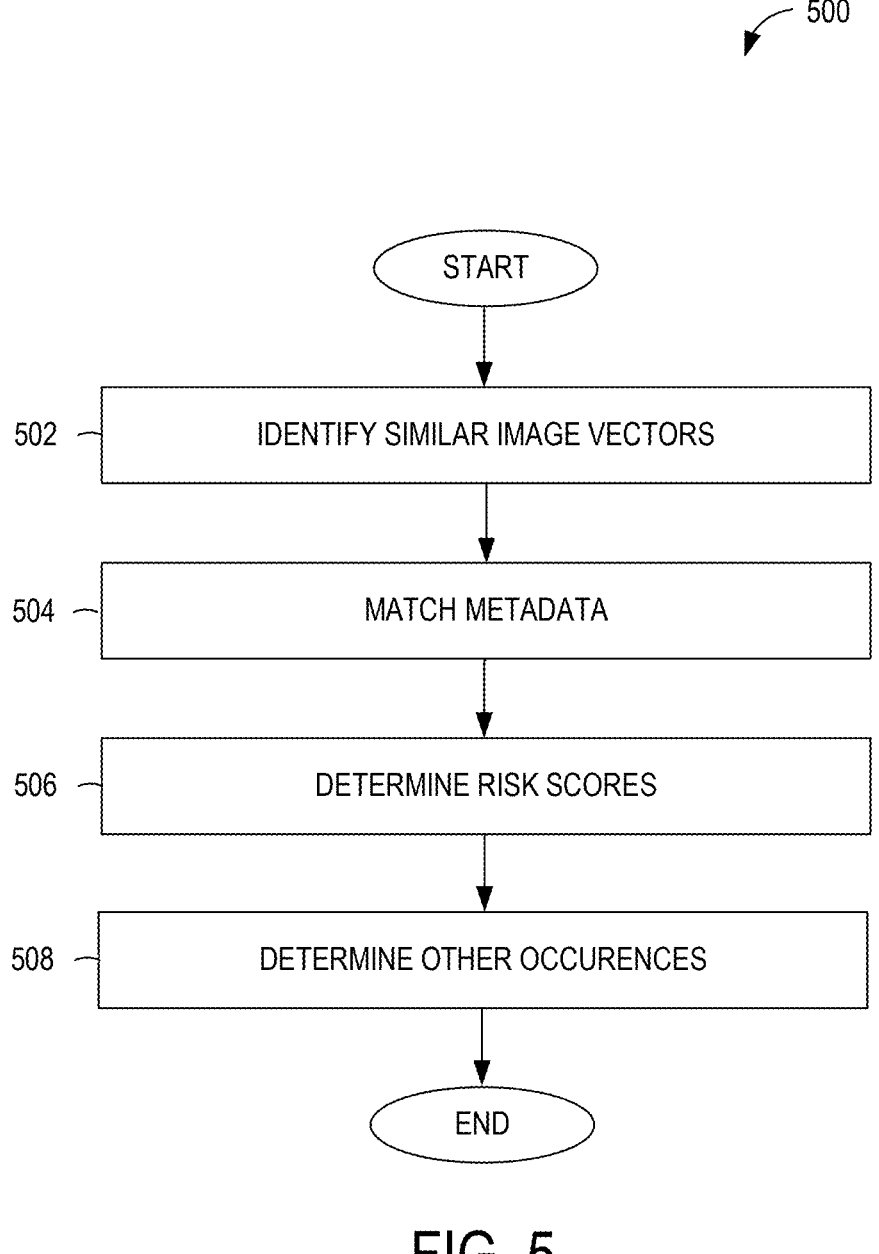
FIG. 5 is a flowchart illustrating operations of a method for searching and ranking biometric signatures, according to example implementations.

FIG. 5 is a flowchart illustrating operations of a method 500 for searching and ranking biometric signatures (e.g., operation 408), according to example implementations.

Operations in the method 500 can be performed by the biometric system 116, using components described above with respect to FIG. 2. Accordingly, the method 500 is described by way of example with reference to the biometric system 116. However, it shall be appreciated that at least some of the operations of the method 500 can be deployed on various other hardware configurations or be performed by similar components residing elsewhere in the network environment 100. Therefore, the method 500 is not intended to be limited to the biometric system 116.

In operation 502, the vector match component 210 identifies historical image vectors that are similar to the image vector generated in operation 406. In some implementations, the vector match component 210 uses cosine similarity to identify the similar historical image vectors. Alternative implementations can contemplate use of other distance similarity measurements to determine similar image vectors. Based on the distance similarity (e.g., cosine similarity), the vector match component 210 identifies an initial set of one or more similar historical image vectors and their corresponding similarity value or initial risk score. The initial set of one or more similar historical image vectors can be historical image vectors with distance similarity measurements meeting or exceeding the similarity threshold.

In operation 504, the metadata match component 212 determines whether corresponding metadata of the historical image vectors identified in operation 502 match metadata associated with the captured user interactions. The metadata can include, for example, keystrokes, click throughs, a location of the user, an Internet Protocol address, a device identifier, a browser specification, a language preference, and/or a time zone.

In operation 506, the scoring component 214 generates an overall risk score for each similar historical image vector of the initial set of similar historical vectors. In one implementation, the scoring component 214 takes the initial risk score (e.g., the cosine similarity) determined in operation 502 for each similar historical image vector and adjusts the initial risk score based on whether corresponding metadata of the similar historical image vectors match metadata associated with the image vector being analyzed in operation 504. The more metadata that matches, the higher an adjustment is made to the initial risk score. The adjustment can be based on the type of metadata that matches and the number of matches. In some cases, the more specific and unique the metadata, the larger the adjustment of the cosine similarity. A final adjusted score or final risk score can be used to rank the similar historical image vectors.

In some cases, the final risk score is compared to a risk score threshold by the scoring component 214. Any similar image vectors that do not transgress the risk score threshold are removed from a final set of similar historical image vectors that are output in the result. In other cases, all identified historical image vectors are output in the result. In some implementations, the risk score threshold is the similarity threshold.

Operations 502 through 506 can be repeated for user interactions that are performed over multiple browser pages or user interfaces and the results combined. In other words, a pattern that includes the results of two separate image vector database queries is used to determine whether the user interactions involve fraudulent behavior. For instance, operations 502 through 506 are performed for a first browser page. Then the process is repeated for a second browser page. The results of these two sets of operations are then combined.

In an alternative implementation, operations 502 through 506 may be performed sequentially. For example, the analysis is first performed for the first browser page. If the analysis indicates that the user interactions are likely associated with fraudulent behavior, then the biometric system analyzes the user interactions on the second browser page. However, if the analysis with the user interactions on the first browser page is not identified as likely being fraudulent behavior, the analysis can, optionally, stop without having to analyze the user interactions on the second browser page.

In a further implementation, the images resulting from the user interactions with the first browser page and the second browser page are combined (e.g., overlapped) into a single image. The combined image is then encoded into a single image vector and compared by the analysis system 206 to the vector database 208 to identify similar historical image vectors.

In operation 508, the analysis system 206 can identify other occurrences of potential fraudulent behavior in other accounts. Once similar historical image vectors are identified that have been flagged as indicating fraudulent behavior, the biometric system 116 can look for other instances of similar image vectors occurring in other accounts of the network system 102 which may not have been previously flagged. If the current user interactions are "matching" historical image vectors that indicate fraudulent behavior, it is possible, that the same user may be using similar or identical user interactions in an attempt to commit fraud in other user accounts. That is, the biometric system 116 tries to leverage the behaviors identified in account A and determine if it is occurring in account B, C, D, and E (e.g., perform a search to compare if the user has already attacked other accounts).

Operation 508 can include identifying similar (historical) image vectors, matching metadata, and determining risk scores for these similar image vectors for other user accounts to identify the other user accounts that may have experienced similar user interactions and potential fraudulent behavior.

While operation 508 is indicated as a separate operation, it is noted that operation 508 can be encompassed in operations 502 through 506. For example, the analysis system 206 can both identify similar historical image vectors that have been tagged as fraudulent and also identify similar historical image vectors for other user accounts that may have experienced similar fraudulent behavior at the same time. In these implementations, operation 508 is not separately needed.

While example implementations have discussed the analysis system 206 as comprising various components that search a vector database 208, an alternative embodiment can use machine learning to perform similar operations. In one example implementation, a neural network can be trained to identify user interaction patterns that are associated with fraudsters. The training can include training on corresponding metadata associated with user interaction patterns that are tagged as indicating fraudulent behavior or activity. For example, the neural network can receive, as training data, cosine similarities of encoded biometrics (e.g., encoded user interactions). This neural network can be consistently retrained as new patterns are discovered. The trained model can then identify whether future user interactions are likely fraud or not fraud based on these patterns.

In yet another alternative implementation, operations 504 and 506 are optional or not performed. Thus, the similar historical image vectors identified in operation 502 (that meet or exceed a similarity threshold) are output as the result in operation 410. Matching metadata and adjusted risk scores are not considered. In these implementations, a top ranked number of similar historical image vectors can be outputted and/or only similar historical image vectors that exceed a particular similarity threshold (e.g., 0.75 or 75%) are outputted.

Figure 6:
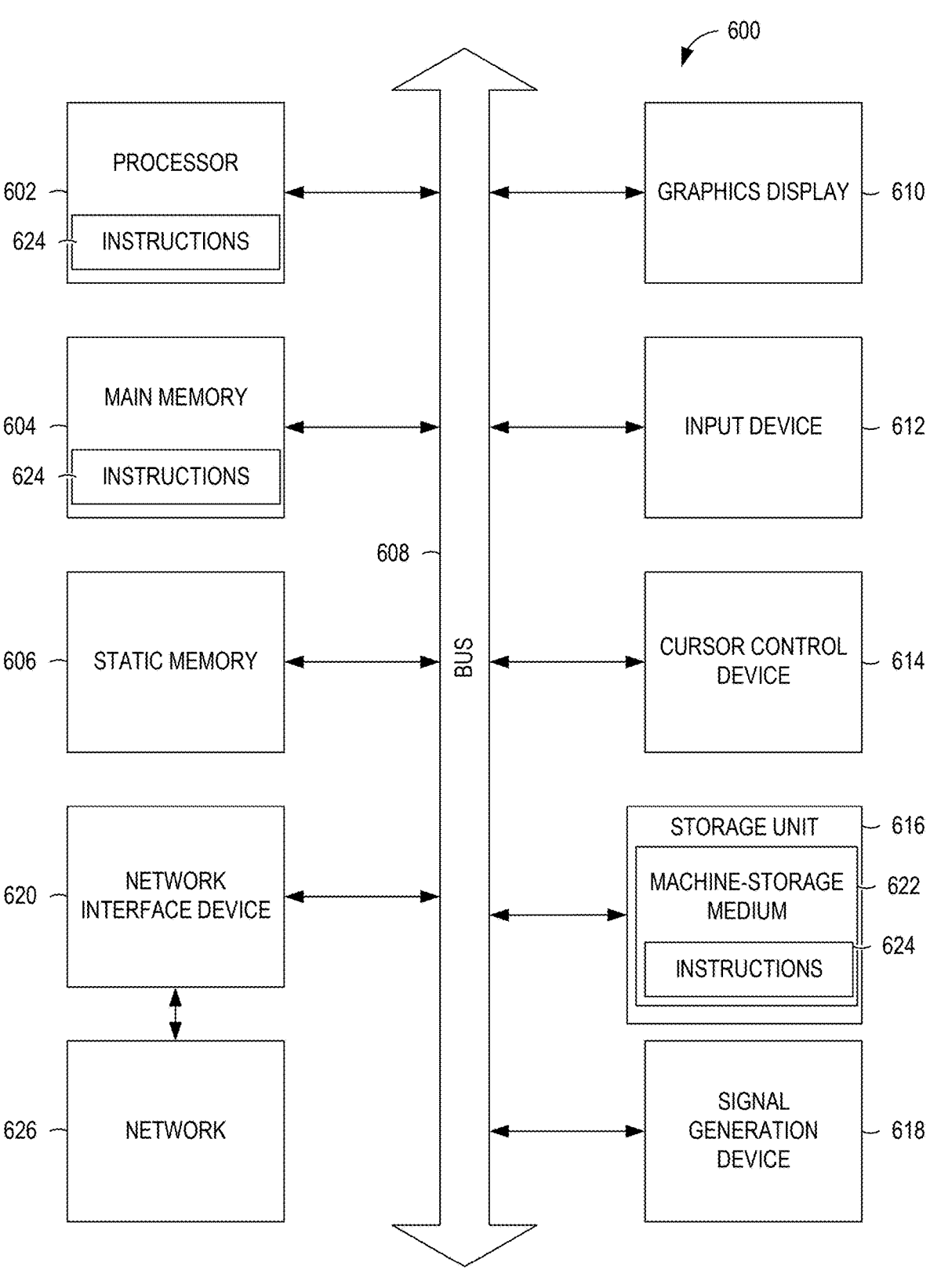
FIG. 6 is a block diagram illustrating components of a machine, according to some examples, able to read instructions from a machine-storage medium and perform any one or more of the methodologies discussed herein.

FIG. 6 illustrates components of a machine 600, according to some example implementations, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein can be executed, in whole or in part.

For example, the instructions 624 can cause the machine 600 to execute the flow diagram of FIG. 4 and FIG. 5. In one implementation, the instructions 624 can transform the machine 600 into a particular machine (e.g., specially configured machine) programmed to carry out the described and illustrated functions in the manner described.

In alternative implementations, the machine 600 operates as a standalone device or can be connected (e.g., networked) to other machines. In a networked deployment, the machine 600 can operate in the capacity of a server machine or a client machine in a server-client network environment, or as a peer machine in a peer-to-peer (or distributed) network environment. The machine 600 can be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 can contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 can be configurable to execute one or more components described herein.

The machine 600 can further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 can also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 can also reside, completely or at least partially, within the main memory 604, within the processor 602 (e.g., within the processor's cache memory), or both, before or during execution thereof by the machine 600. Accordingly, the main memory 604 and the processor 602 can be considered as machine-storage media (e.g., tangible and non-transitory machine-storage media). The instructions 624 can be transmitted or received over a network 626 via the network interface device 620.

In some example implementations, the machine 600 can be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components can be accessible and available for use by any of the components described herein.

Executable Instructions and Machine-Storage Medium

The various memories (e.g., 604, 606, and/or memory of the processor(s) 602) and/or storage unit 616 can store one or more sets of instructions and data structures (e.g., software) 624 embodying or utilized by any one or more of the methodologies or functions described herein. These instructions, when executed by processor(s) 602 cause various operations to implement the disclosed implementations.

As used herein, the terms "machine-storage medium," "device-storage medium," "computer-storage medium" (referred to collectively as "machine-storage medium 622") mean the same thing and can be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and can be used interchangeably in this disclosure. The terms are defined to include both machine-storage media and signal media. Thus, the terms include both storage devices/media and carrier waves/modulated data signals.

The instructions 624 can further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components can be combined via their interfaces with other components to carry out a machine process. A component can be a packaged functional hardware unit designed for use with other components and a part of a program that usually performs a particular function of related functions. Components can constitute either software components (e.g., code embodied on a machine-readable medium) or hardware components.

A "hardware component" is a tangible unit capable of performing certain operations and can be configured or arranged in a certain physical manner. In various example implementations, one or more computer systems (e.g., a standalone computer system, a client computer system, or a server computer system) or one or more hardware components of a computer system (e.g., a processor or a group of processors) can be configured by software (e.g., an application or application portion) as a hardware component that operates to perform certain operations as described herein.

In some implementations, a hardware component can be implemented mechanically, electronically, or any suitable combination thereof. For example, a hardware component can include dedicated circuitry or logic that is permanently configured to perform certain operations. For example, a hardware component can be a special-purpose processor, such as a field programmable gate array (FPGA) or an ASIC. A hardware component can also include programmable logic or circuitry that is temporarily configured by software to perform certain operations. For example, a hardware component can include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), can be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor can be configured as respectively different special-purpose processors (e.g., comprising different hardware components) at different times. Software can accordingly configure a processor, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In examples in which multiple hardware components are configured or instantiated at different times, communications between such hardware components can be achieved, for example, through the storage and retrieval of information in memory structures to which the multiple hardware components have access. For example, one hardware component can perform an operation and store the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions described herein. As used herein, "processor-implemented component" refers to a hardware component implemented using one or more processors.

Similarly, the methods described herein can be at least partially processor-implemented, a processor being an example of hardware. For example, at least some of the operations of a method can be performed by one or more processors or processor-implemented components. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an application program interface (API)).

The performance of certain of the operations can be distributed among the one or more processors, not only residing within a single machine, but deployed across a number of machines. In some example implementations, the one or more processors or processor-implemented components can be located in a single geographic location (e.g., within a home environment, an office environment, or a server farm). In other example implementations, the one or more processors or processor-implemented components can be distributed across a number of geographic locations.

EXAMPLES

Example 1 is a method for detecting fraudulent activity using biometric signatures. The method comprises capturing, by a capture component, data associated with user interactions of a user with a user interface displayed by a computing device, the captured data including mouse movement; converting the captured data into an image of the mouse movement; encoding, by an image encoder, the image into an image vector; searching, by an analysis system, a vector database to identify one or more historical image vectors in the vector database that meet or exceed a similarity threshold in comparison to the image vector, the vector database comprising a plurality of image vectors corresponding to previously encoded images, at least some of the plurality of image vectors being flagged as indicating fraudulent activity; and outputting a result based on the identified historical image vectors, the result comprising a risk score for each of the identified historical image vectors that is based in part on a similarity difference measurement.

In example 2, the subject matter of example 1 can optionally include wherein the captured data further comprises keystrokes or click throughs, the keystrokes or click throughs being included as metadata with the image vector.

In example 3, the subject matter of any of examples 1-2 can optionally include wherein the captured data further comprises speed of the mouse movement or pressure applied on the computing device during the mouse movement; and the converting of the captured data into the image comprises generating the image of the mouse movements with the speed or pressure with color.

In example 4, the subject matter of any of examples 1-3 can optionally include wherein the captured data further comprises captured metadata associated with the user interaction; and the searching further comprises matching the captured metadata to metadata associated with the one or more historical image vectors, the risk score being adjusted based on the matching of the captured metadata to the metadata associated with the one or more historical image vectors.

In example 5, the subject matter of any of examples 1-4 can optionally include wherein the metadata comprises one or more of a location of the user, an Internet Protocol address, a device identifier, a browser specification, a language preference, or a time zone.

In example 6, the subject matter of any of examples 1-5 can optionally include wherein the capturing the mouse movement comprises capturing a position of a mouse as it moves around the user interface at various times.

In example 7, the subject matter of any of examples 1-6 can optionally include wherein the capturing the data occurs over multiple browser pages; the converting the captured data into the image comprises generating an image for each browser page based on data from each browser page; the searching occurs for each image vector corresponding to the image associated with each browser page; and the method further comprises combining the one or more historical image vectors for each image vector into a single result for output.

In example 8, the subject matter of any of examples 1-7 can optionally include wherein the user interface comprises a web browser, the user interface displaying at least a login page accessed via the web browser.

In example 9, the subject matter of any of examples 1-8 can optionally include wherein the user interface comprises an interface displayed by a terminal device, the interface presenting a request for a signature from the user, the data associated with the user interactions being captured during signing of the signature.

In example 10, the subject matter of any of examples 1-9 can optionally include wherein the user interface displays a prompt requesting the user to draw a specific object, the data associated with the user interactions being captured during drawing of the specific object.

In example 11, the subject matter of any of examples 1-10 can optionally include wherein the searching comprises identifying historical image vectors of other instances of potential fraud that may have occurred in a different account than an account being accessed by the user based on the user interactions.

In example 12, the subject matter of any of examples 1-11 can optionally include wherein the image encoder is a trained neural network.

In example 13, the subject matter of any of examples 1-12 can optionally include wherein the outputting the result based on the identified historical image vectors comprises determining historical image vectors that have a risk score that transgresses a risk score threshold.

In example 14, the subject matter of any of examples 1-13 can optionally include wherein the searching is based on cosine similarity.

In example 15, the subject matter of any of examples 1-14 can optionally include based on the result, identifying the image vector as indicating fraudulent activity and tagging the image vector as fraudulent; and based on the image vector being tagged fraudulent, storing the image vector to the vector database for use in future analysis.

Example 16 is a system for detecting fraudulent activity based on biometric signatures. The system comprises one or more processors and a memory storing instructions that, when executed by the one or more processors, cause the one or more processors to perform operations comprising capturing data associated with user interactions of a user with a user interface displayed by a computing device, the captured data including mouse movement; converting the captured data into an image of the mouse movement; encoding the image into an image vector; searching a vector database to identify one or more historical image vectors in the vector database that meet or exceed a similarity threshold in comparison to the image vector, the vector database comprising a plurality of image vectors corresponding to previously encoded images, at least some of the plurality of image vectors being flagged as indicating fraudulent activity; and outputting a result based on the identified historical image vectors, the result comprising a risk score for each of the identified historical image vectors that is based in part on a similarity difference measurement.

In example 17, the subject matter example 16 can optionally include wherein the captured data further comprises captured metadata associated with the user interaction; and the searching further comprises matching the captured metadata to metadata associated with the one or more historical image vectors, the risk score being adjusted based on the matching of the captured metadata to the metadata associated with the one or more historical image vectors.

In example 18, the subject matter of any of examples 16-18 can optionally include wherein the user interface comprises an interface displayed by a terminal device, the interface presenting a request for a signature from the user, the data associated with the user interactions being captured during signing of the signature.

In example 19, the subject matter of any of examples 16-18 can optionally include wherein the user interface displays a prompt requesting the user to draw a specific object, the data associated with the user interactions being captured during drawing of the specific object.

Example 20 is a computer-storage medium comprising instructions which, when executed by one or more processors of a machine, cause the machine to perform operations for detecting fraudulent activity based on biometric signatures. The operations comprise capturing data associated with user interactions of a user with a user interface displayed by a computing device, the captured data including mouse movement; converting the captured data into an image of the mouse movement; encoding the image into an image vector; searching a vector database to identify one or more historical image vectors in the vector database that meet or exceed a similarity threshold in comparison to the image vector, the vector database comprising a plurality of image vectors corresponding to previously encoded images, at least some of the plurality of image vectors being flagged as indicating fraudulent activity; and outputting a result based on the identified historical image vectors, the result comprising a risk score for each of the identified historical image vectors that is based in part on a similarity difference measurement.

Some portions of this specification can be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities can take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like can refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes can be made to these examples without departing from the broader scope of examples of the present invention. For instance, various examples or features thereof can be mixed and matched or made optional by a person of ordinary skill in the art. Such examples of the present subject matter can be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples can be used and derived therefrom, such that structural and logical substitutions and changes can be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various examples of the present invention. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method comprising:
capturing, by a capture component, data associated with user interactions of a user with a user interface displayed by a computing device, the captured data including mouse movement;
generating a graphical image depicting a visual representation of a path of the mouse movement from the captured data;

encoding, by an image encoder, the graphical image into an image vector;
searching, by an analysis system, a vector database comprising a plurality of previously encoded image vectors that are indexed for vector similarity searching, the searching comprising using vector similarity matching to retrieve and rank one or more historical image vectors in the vector database that meet or exceed a similarity threshold in comparison to the image vector, at least some of the plurality of previously encoded image vectors being flagged as indicating fraudulent activity; and
outputting a result based on the one or more identified historical image vectors retrieved from the vector database, the result comprising a risk score for each of the one or more identified historical image vectors that is based in part on a similarity difference measurement.

2. The method of claim 1, wherein the captured data further comprises keystrokes or click throughs, the keystrokes or click throughs being included as metadata with the image vector.

3. The method of claim 1, wherein:
the captured data further comprises speed of the mouse movement or pressure applied on the computing device during the mouse movement; and
the generating the graphical image comprises generating a graphical image of the mouse movements with the speed or pressure encoded as color.

4. The method of claim 1, wherein:
the captured data further comprises captured metadata associated with the user interaction; and
the searching further comprises matching the captured metadata to metadata associated with the one or more historical image vectors, the risk score being adjusted based on the matching of the captured metadata to the metadata associated with the one or more historical image vectors.

5. The method of claim 4, wherein the metadata comprises one or more of a location of the user, an Internet Protocol address, a device identifier, a browser specification, a language preference, or a time zone.

6. The method of claim 1, wherein the capturing the data comprises capturing a position of a mouse as it moves around the user interface at various times.

7. The method of claim 1, wherein:
the capturing the data occurs over multiple browser pages;
the generating the graphical image comprises generating a graphical image depicting a visual representation of a path for each browser page based on data from each browser page;
the searching occurs for each image vector corresponding to the image associated with each browser page; and
the method further comprises combining the one or more historical image vectors for each image vector into a single result for output.

8. The method of claim 1, wherein the user interface comprises a web browser, the user interface displaying at least a login page accessed via the web browser.

9. The method of claim 1, wherein the user interface comprises an interface displayed by a terminal device, the interface presenting a request for a signature from the user, the data associated with the user interactions being captured during signing of the signature.

10. The method of claim 1, wherein the user interface displays a prompt requesting the user to draw a specific object, the data associated with the user interactions being captured during drawing of the specific object.

11. The method of claim 1, wherein the searching comprises identifying historical image vectors of other instances of potential fraud that may have occurred in a different account than an account being accessed by the user based on the user interactions.

12. The method of claim 1, wherein the encoding is performed by a trained neural network of the image encoder.

13. The method of claim 1, further comprising:

determining historical image vectors that have a risk score that transgresses a risk score threshold, wherein the outputting the result is based on the historical image vectors that have the risk score that transgresses the risk score threshold.

14. The method of claim 1, wherein the searching is based on cosine similarity.

15. The method of claim 1, further comprising:

based on the result, identifying the image vector as indicating fraudulent activity and tagging the image vector as fraudulent; and based on the image vector being tagged fraudulent, storing the image vector to the vector database for use in future analysis.

16. A system comprising:

one or more processors; and a memory storing instructions that, when executed by the one or more processors, cause the one or more processors to perform operations comprising:

capturing data associated with user interactions of a user with a user interface displayed by a computing device, the captured data including mouse movement;

generating a graphical image depicting a visual representation of a path of the mouse movement from the captured data;

encoding the graphical image into an image vector;

searching a vector database comprising a plurality of previously encoded image vectors that are indexed for vector similarity searching the searching comprising using vector similarity matching to retrieve and rank one or more historical image vectors in the vector database that meet or exceed a similarity threshold in comparison to the image vector, at least some of the plurality of previously encoded image vectors being flagged as indicating fraudulent activity; and outputting a result based on the one or more identified historical image vectors retrieved from the vector database, the result comprising a risk score for each of the one or more identified historical image vectors that is based in part on a similarity difference measurement.

17. The system of claim 16, wherein:

the captured data further comprises captured metadata associated with the user interaction; and the searching further comprises matching the captured metadata to metadata associated with the one or more historical image vectors, the risk score being adjusted based on the matching of the captured metadata to the metadata associated with the one or more historical image vectors.

18. The system of claim 16, wherein the user interface comprises an interface displayed by a terminal device, the interface presenting a request for a signature from the user, the data associated with the user interactions being captured during signing of the signature.

19. The system of claim 16, wherein the user interface displays a prompt requesting the user to draw a specific object, the data associated with the user interactions being captured during drawing of the specific object.

20. A machine-storage medium comprising instructions which, when executed by one or more processors of a machine, cause the machine to perform operations comprising:

capturing data associated with user interactions of a user with a user interface displayed by a computing device, the captured data including mouse movement;

generating a graphical image depicting a visual representation of a path of the mouse movement from the captured data;

encoding the graphical image into an image vector;

searching a vector database comprising a plurality of previously encoded image vectors that are indexed for vector similarity searching, the searching comprising using vector similarity matching to retrieve and rank one or more historical image vectors in the vector database that meet or exceed a similarity threshold in comparison to the image vector, at least some of the plurality of previously encoded image vectors being flagged as indicating fraudulent activity; and outputting a result based on the one or more identified historical image vectors retrieved from the vector database, the result comprising a risk score for each of the one or more identified historical image vectors that is based in part on a similarity difference measurement.

\* \* \* \* \*